(No Model.) 2 Sheets—Sheet 1.
G. F. PACKARD.
ELECTRIC METER.
No. 587,015. Patented July 27, 1897.
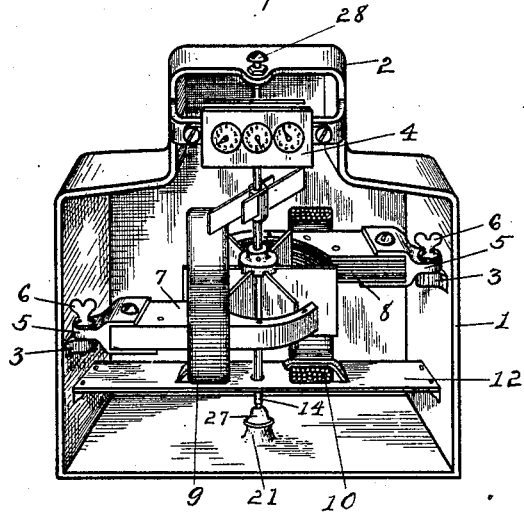
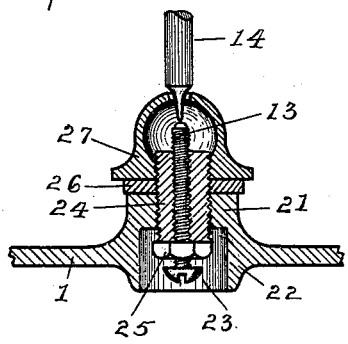
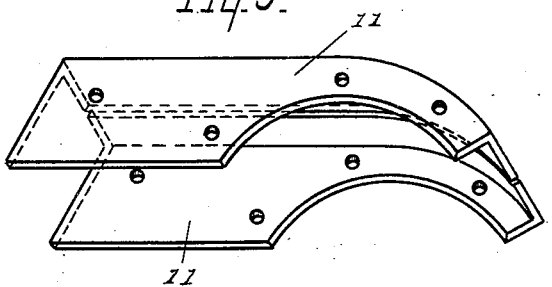
WITNESSES: N. Webster Schlater, Minnie E. Schlater
G. Frederick Packard INVENTOR
BY Chapin & Denny
his ATTORNEYS (No Model.) 2 Sheets—Sheet 2.

G. F. PACKARD.
ELECTRIC METER.

No. 587,015. Patented July 27, 1897.

WITNESSES:
N. Webster Schlater
Minnie E. Schlater

G. Frederick Packard INVENTOR

BY Chapin & Denny
his ATTORNEYS.

United States Patent Office.

GRANVILLE FREDERICK PACKARD, OF FORT WAYNE, INDIANA.

ELECTRIC METER.

SPECIFICATION forming part of Letters Patent No. 587,015, dated July 27, 1897.

Application filed May 6, 1897. Serial No. 635,290. (No model.)

*To all whom it may concern:*

Be it known that I, GRANVILLE FREDERICK PACKARD, a citizen of the United States, residing at Fort Wayne, in the county of Allen, in the State of Indiana, have invented certain new and useful Improvements in Electric Meters; and I do hereby declare that the following is a full, clear, and exact description of the invention, which will enable others skilled in the art to which it appertains to make and use the same, reference being had to the accompanying drawings, which form part of this specification.

My invention relates to improvements in electric meters for measuring the energy consumed in alternating, pulsating, or intermittent electric currents; and this invention is designed particularly as an improvement upon the electric meter shown and described in my former patent, dated January 5, 1897, and numbered 574,565.

In my present invention I have simplified certain features of construction and improved the operative parts.

The object of my invention is to provide an improved meter of simple and economical construction having few parts and of improved efficiency and reliability.

My improvement comprises a revoluble metallic armature having a series of radial retarding-vanes, the said armature being arranged in inductive relation to one or more electromagnets connected in the work-circuit through which passes the current to be measured and being adapted to be actuated by the repellent action of the eddy-currents set up by the magnetic blast of the said electromagnets, and a registering-train operatively connected with said armature and adapted to indicate the consumption of energy in the circuit.

The principal novel features of my invention consist in my improved form and construction of armature, an improved removable jewel-bearing for the lower end of the armature-shaft, an improved core-casing or magnetic shield, and an adjustable speed-regulator for the armature-shaft.

Similar reference-numerals in the accompanying drawings indicate like parts throughout the several views.

Figure 4:
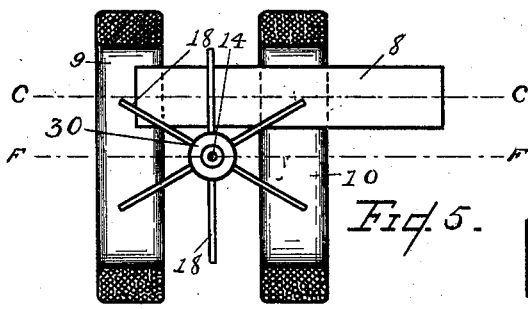
Figure 5:
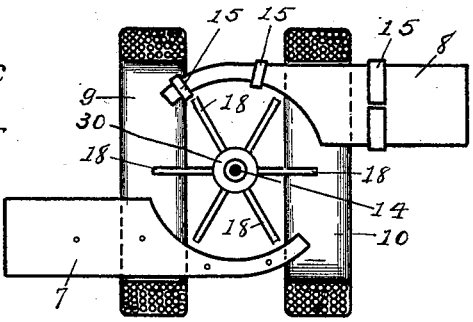
Figure 6:
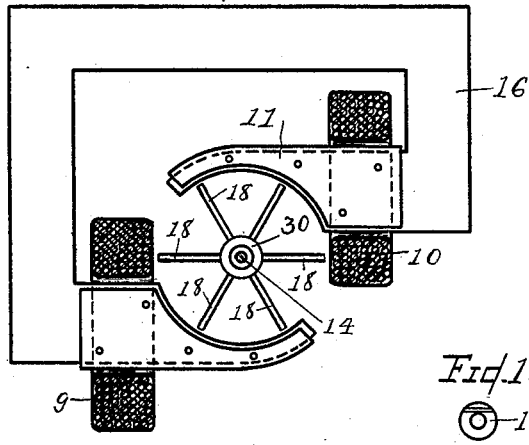
Figure 7:
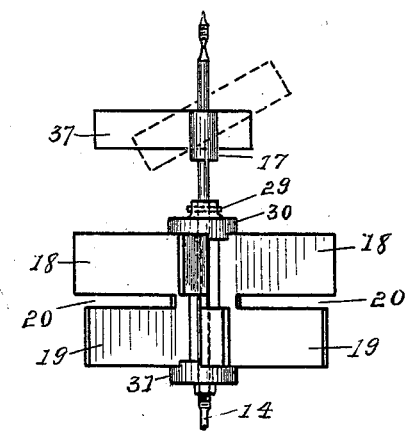
Figure 10:
Figure 9:
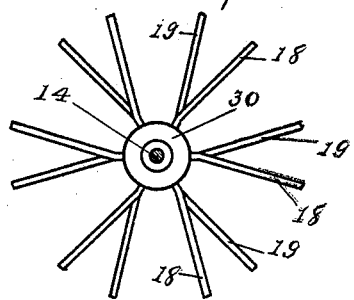
Figure 8:
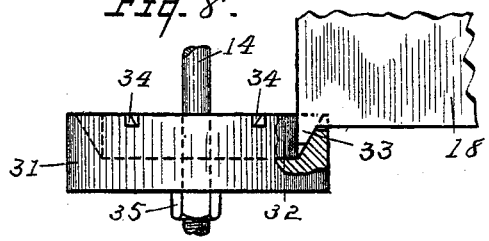

Figure 1 is a perspective view of my invention mounted in a proper containing-case and showing the relative arrangement of the operative parts. Fig. 2 is an enlarged detail, in vertical section, of my improved jewel-bearing with the lower end of the armature-shaft in position therein. Fig. 3 is a detail perspective of my improved core-casing or magnetic shield. Figs. 4, 5, and 6 show modified forms of the cores and modified arrangements of the revoluble armature relatively to the inducing-coils and the said cores. Fig. 7 is a detail of my improved armature with the adjustable speed-regulator in position thereon. Fig. 8 is an enlarged detail of the lower clamping-head, showing the manner of securing the vanes therein. Fig. 9 is a detail plan of the armature, showing a modified arrangement of the radial vanes. Fig. 10 is a detail plan of the slotted cylindrical support of the speed-regulator.

The containing-case 1, of sheet metal or other proper material, of any desired form or size, preferably has an upright extension 2 midway its sides adapted to contain the dial 4 and its accompanying registering-train, Fig. 1. At a proper distance above the base of said case 1 and to two opposite sides thereof is rigidly fixed a supporting-shelf 12, on which the energizing field-coils 9 and 10 are properly secured in a transverse position. These inducing-coils are properly connected in the main source of supply, feeding the lamps or motors whose consumption of energy it is desired to measure. At proper points on the opposite sides of said case are rigidly fixed or cast integrally therewith the lugs 3, having a vertical screw-threaded opening for the thumb-screw 6, on which is swiveled the respective clamps 5, in which is rigidly secured the outer end of the respective cores 7 and 8, whereby said cores are provided with a convenient lateral adjustment, Fig. 1. The said cores 7 and 8 are identical in form, dimensions, and construction, are preferably laminated, have their plates or laminæ rigidly secured together by proper rivets or clamping-bands 15, Fig. 4, or by being inclosed by a proper containing-sheath, Figs. 3 and 6. The laminæ or punchings of the said cores may be connected by an integral portion 16, Fig. 6, if desired. The forward end of said cores are cut away upon their inner face and curved, as shown, so that their inner curved face, if extended, would be approximately concentric with the circle described by the revolving armature. The inner concave faces of the said cores are arranged in close proximity to the ends of the armature-vanes, as shown in Figs. 1, 4, and 6, for the purpose of increasing the torque.

The inducing field-coils may be so disposed as to embrace both of the magnetic cores, as shown in Figs. 1 and 4, or they may be so arranged as to embrace but a single core each, as shown in Fig. 6.

At a proper point on the base of case 1 and upon the upper face thereof is provided a circular boss 21, having a vertical screw-threaded opening in which the externally-screw-threaded plug 24 is mounted. The lower face of said base may also have a boss 22, having an opening 23 of greater diameter than said screw-plug, which opening is extended into the said boss 21. Upon the upper end of said screw-plug 24 and next adjacent to the face of said boss 21 is arranged a lock-nut 26, and on said plug next to said nut is mounted by a screw-threaded connection the hollow cap 27, having its top centrally apertured for the reduced and pointed lower extremity of the armature-shaft 14. The said screw-plug 24 is provided with a longitudinal central screw-threaded opening for the jeweled screw 13, having upon its lower end a holding-nut 25. Upon the upper jeweled end of this screw the lower end of the shaft 14 is pivotally supported, Fig. 2. This screw affords a convenient means for vertically adjusting the said shaft. In the top of the containing-case 1 is properly secured a vertical screw 28, Fig. 1, having its lower end centrally drilled to receive and form a bearing for the pivoted upper end of said shaft 14 in the usual manner. In the two bearings thus described, arranged in vertical alinement, the said shaft 14 is revolubly mounted and connects with a train of wheels communicating motion to a suitable counting mechanism.

The armature, of aluminium or other good electric conducting material, is rigidly fixed upon the shaft 14 by a pin 29, Fig. 7, which passes through a diametric perforation in said shaft and secures a clamping-head, hereinafter described. The said armature is concentric with its axis, is arranged in a proper inductive relation to its energizing source, and comprises a plurality of radial vanes 18, which may be, if desired, provided midway their upper and lower ends with an open transverse slot 20, adapted to receive the inner projecting free ends of the said cores, as shown in Fig. 5 and fully set forth in my said patent above mentioned. In addition to the slotting of said vanes either or both their upper portion and lower portion 19 may be bent laterally, as shown in Figs. 7 and 9, for the purpose of obviating dead-points. The radial vanes 18 of said armature are rigidly secured together against lateral movement or displacement by a pair of circular clamping-heads 30 and 31, Figs. 7 and 8, whose inner holding-faces are identical in construction and are described as follows: The inner holding-face has an annular groove or recess 32 of proper depth, preferably V-shaped, adapted to receive a projecting lug 33 upon the adjacent edge of said vane. The said vane also has a series of radial slots 34, adapted to receive and secure the adjacent edge of said vanes. When the said clamping-heads 30 and 31 thus constructed are tightly clamped to said vanes, the former rigidly secured to shaft 14 by the diametric pin 29 and the latter by a proper lock-nut 35, Fig. 8, the said vanes or blades will be rigidly and securely interlocked with said clamping-heads, which are also concentric with said shaft. It is obvious that the mere form and arrangement of the interlocking lugs 33 and the recess 32 may be indefinitely varied without departing from the spirit of my invention. Whatever be the relative arrangement or construction of the said vanes, whether truly radial, as seen in Figs. 1, 4, and 6, or slightly bent, as seen in Fig. 9, they are secured in position in the manner above described.

My improved core-casing or magnetic shield, Fig. 3, preferably comprises two parts 11, similar in construction and similar in outline to the said magnetic cores, and are provided with a series of coincident lateral perforations for the core-rivets above mentioned. The function of the said core-shield is to hold the laminæ or punchings together and at the same time to concentrate the magnetic flux of the cores upon the armature-vanes.

My improved speed-regulator comprises a cylindrical support 17, having a central aperture for the supporting-shaft 14 and provided upon its upper face with a vertical slot, Fig. 10, and a strip or plate 37, of mica or other light and suitable material, Fig. 7, adapted to be tightly but adjustably mounted in said vertical slot in said support 17, which is fixed on said shaft by a set-screw or other proper manner. This device is adapted for a minute and delicate adjustment of the speed of said armature by tilting the same in said slot toward or from a horizontal position, as shown in dotted outline in Fig. 7. This speed-regulator is specially designed for use when the two cores are integral, as shown in Fig. 6, its use not being otherwise absolutely essential, though desirable in all cases.

If desirable, the support 17 may be provided with two vertical slots for a pair of adjustable strips 37, as shown in Fig. 1, in which case the speed of the armature may be regulated by a longitudinal adjustment of said strips in said slots. This arrangement, it has been found, more perfectly balances the armature.

The operation and manner of employing my invention thus described are substantially as follows: The magnetic cores 7 and 8, which may or may not be in horizontal alinement, as desired, are laterally adjusted to secure the desired proximity to the armature-vanes by means of the thumb-screws 6, Fig. 1, and a more minute and delicate adjustment of the armature speed may be secured by the employment and adjustment of the said regulating-strips 37.

By the use of my improved jewel-bearing the jewel-screw can readily be removed or replaced without removal or displacement of the armature-shaft, as the tapering end will rest securely in the flaring containing-aperture in the cap 27 when the jewel-screw is removed, Fig. 2. The said jewel-screw can conveniently be adjusted to properly raise or lower the shaft 14 by inserting a proper tool in the enlarged recess 23. It is obvious that the armature-vanes can readily be detached or replaced at pleasure by loosening the said clamping-plates 30 and 31.

In Fig. 5 is shown a modified arrangement of my invention in which the magnet-core is placed in parallel relation to the axis F F of the energizing-coils, creating thereby an eddy-current field upon the fan-blades, which is parallel but exactly opposite in direction to the field established by the said coils, as shown by the line C C. This arrangement is especially advantageous because of the strong torque obtainable therewith.

The rotation of the armature is produced by eddy-current repulsion, the magnetic field acting upon the vanes thereof like an escaping fluid, taking the same direction as that of the lines of force of the magnetic field in which the said armature is arranged and in which the said vanes are actuated by the bombarding lines of force, as fully set forth and described in my said Patent No. 574,565, of which the present invention is an improvement in certain details of construction.

Having thus described my invention and the manner of operating the same, what I desire to secure by Letters Patent is—

1. The combination, in an electric meter of an energizing coil or coils or field of force; a rotary armature comprising a plurality of separable radial vanes rigidly connected on their supporting shaft or spindle by a pair of recessed and slotted disks interlocking therewith as described, the said vanes being so arranged in inductive relation to said field as to be successively repelled therefrom; the clamping-disks 30 and 31 mounted on said shaft as shown and having their inner faces recessed to receive interlocking lugs on said vanes and radially slotted for the purpose specified; a speed-regulator comprising a slotted base 17 fixed on said shaft and one or more adjustable strips 37 arranged therein as shown; and a counting or registering train connected with said armature, all substantially as described.

2. In an electric meter or motive device, the combination of a rotatable armature comprising a plurality of separable radial retarding-vanes upon which are brought to bear the inducing field or fields of one or more electromagnets for the purpose of generating eddy-currents upon said vanes for the purpose of repelling the same, and a pair of clamping-disks adapted to rigidly secure said vanes by an interlocking union therewith; the vertical shaft 14 upon which the said armature is fixed; a jewel-bearing for the tapering lower end of said shaft comprising a screw-plug 24 mounted as shown in the upright boss 21 of the case 1, a hollow apertured cap 27 mounted on said plug by a screw-threaded connection and provided with a central perforation for the tapering lower end of said shaft, a lock-nut 26 mounted on said plug as shown, and a jeweled screw 13 adjustably arranged in said plug and provided upon its lower end with a holding-nut 25; an adjustable speed-regulator as described; and a registering-train connected with said armature and actuated thereby, all substantially as described.

3. In an electric meter or motive device a rotary armature arranged in inductive relation to an energizing field of force as shown, and comprising a plurality of separable retarding-vanes rigidly connected by a pair of clamping-disks adapted for an interlocking union therewith, as described, the said vanes being so arranged relative to said field as to have induced upon their surfaces eddy or vortex currents whose field is opposed or repelled by the inducing-field, thereby producing rotation, all substantially as described.

4. In an electric meter, a speed-regulator comprising a slotted base 17 fixed on the armature-shaft as described, and one or more strips or plates 37 adjustably mounted in the slots of said base, for the purpose of securing an accurate regulation of speed.

5. In an electric meter a core-casing or magnetic shield open as shown upon the side thereof adjacent to the rotatable armature, adapted to contain the laminæ or punchings and secure the same against displacement, and to concentrate the magnetic flux of the cores upon the armature-vanes, constructed and arranged substantially as described.

6. In an electric meter or motive device a jewel-bearing for the lower end of the armature-shaft, consisting of a screw-plug 24 removably mounted in an apertured vertical boss 21 on the base of the containing-case, a locking-nut 26 mounted on said plug as shown, a hollow cap 27 mounted on the upper end of said plug and provided with a vertical aperture adapted to receive the lower tapering end of said shaft, and a jewel-screw 13 adjustably mounted in said plug provided with a holding-nut 25 and adapted to pivotally support the said armature-shaft, all substantially as described.

7. The combination in an electric meter of a single magnet-core adapted to establish the line of magnetization C C parallel with the line of magnetization F F of the energizing-coils; a pair of energizing-coils connected in the main circuit; a speed-regulator as described attached to the armature-shaft; a revoluble metallic armature provided with a plurality of detachable radial retarding-vanes; and a registering-train actuated by the movements of the armature.

8. In an electric meter for alternating currents the combination with a revoluble metallic armature provided with detachable radial retarding-vanes, of a pair of energizing-coils whose axes are coincident with each other and with the line of magnetization established by the said coils; a pair of magnet-cores located on opposite sides of the shaft and in parallel relation with each other, each being adapted to establish a line of magnetization parallel with the line of magnetization F F of the energizing-coils; a speed-regulator as described; and a counting or registering train in gear with the armature-shaft, all substantially as described.

Signed by me, at Fort Wayne, Allen county, State of Indiana, this 28th day of April, A. D. 1897.

G. FREDERICK PACKARD.

Witnesses:
ROBERT S. ROBERTSON,
AUGUSTA VIBERG.